(12) United States Patent
Kern et al.

(10) Patent No.: US 7,267,404 B2
(45) Date of Patent: Sep. 11, 2007

(54) ARRANGEMENT FOR CONTROLLING A FLUID VOLUME IN SHAPE CHANGING ELEMENTS OF SEATS

(75) Inventors: Christoph Kern, Weil der Stadt (DE); Thaddaeus Buratowski, Lengenaltheim (DE); Markus Koepfer, Moenchsroth (DE)

(73) Assignee: Alfmeier Praezision AG, Treuchtlingen (DE)

( * ) Notice: Subject to any disclaimer, the term of this patent is extended or adjusted under 35 U.S.C. 154(b) by 504 days.

(21) Appl. No.: 10/947,462

(22) Filed: Sep. 22, 2004

(65) Prior Publication Data
US 2005/0067868 A1 Mar. 31, 2005

(30) Foreign Application Priority Data
Sep. 27, 2003 (DE) ................ 103 44 974

(51) Int. Cl.
*A47C 4/54* (2006.01)
*F17D 11/065* (2006.01)
(52) U.S. Cl. .............................. 297/284.6; 137/625.25; 137/625.11
(58) Field of Classification Search ........... 137/625.25, 137/625.11; 5/713; 297/284.6, 452.41
See application file for complete search history.

(56) References Cited

U.S. PATENT DOCUMENTS

| 3,959,024 A | * | 5/1976 | Kirk et al. | ............. | 137/625.25 |
| 4,136,853 A | * | 1/1979 | Johansson et al. | ........... | 251/282 |
| 4,491,157 A | * | 1/1985 | Hashimoto | .................. | 137/871 |
| 4,491,364 A | * | 1/1985 | Hattori et al. | ........... | 297/284.6 |
| 4,552,402 A |   | 11/1985 | Huber et al. |   |   |
| 4,570,676 A | * | 2/1986 | Nishio et al. | ................ | 137/870 |
| 4,683,914 A | * | 8/1987 | Brisland | ................. | 137/625.48 |
| 5,135,282 A | * | 8/1992 | Pappers | .................... | 297/284.3 |
| 6,203,105 B1 | * | 3/2001 | Rhodes, Jr. | ............... | 297/284.6 |
| 6,895,988 B2 | * | 5/2005 | Grant et al. | ........... | 137/119.01 |

FOREIGN PATENT DOCUMENTS

| DE | 31 42 833 A1 | 5/1983 |
| DE | 83 34 946.4 | 4/1984 |
| DE | 100 63 478 A1 | 7/2002 |

\* cited by examiner

*Primary Examiner*—Milton Nelson, Jr.
(74) *Attorney, Agent, or Firm*—Michael J. Striker

(57) ABSTRACT

A device for controlling a fluid volume in shape changing elements of vehicle seats has a sliding valve connectable with a fluid pressure source and with shape changing elements for filling the shape changing elements with fluid and discharging fluid from the shape changing elements, the sliding valve having a housing provided with connecting openings for a corresponding one of the shape changing elements and a control slider movable in the housing relative to the connecting openings, the control slider having at least one control opening cooperating with the connecting openings and at least one connecting passage which opens in the control opening and is loadable with fluid from the fluid pressure source, the control slider being formed as an axial slider which is guided on the housing, the axial slider having an axial displaceably sliding head provided with the at least one control opening and the at least one connecting passage and a slider rod rigidly connected with the slider head for axial displacement of the slider head, and the connecting openings in a sliding direction of the slider head being arranged in a row at a distance one after the other.

9 Claims, 2 Drawing Sheets

ARRANGEMENT FOR CONTROLLING A FLUID VOLUME IN SHAPE CHANGING ELEMENTS OF SEATS

BACKGROUND OF THE INVENTION

The present invention relates to an arrangement for controlling a fluid volume in shape changing elements of seats, in particular vehicle seats.

Shape changing elements in seats, also known as seat inserts, are used for improvement of sitting comfort by individual adaptation of the seat contours of the seats to a seat user and are utilized in so-called multi-contour backs in the vehicle seats also for massaging the seat user.

In a known vehicle seat disclosed for example in German patent document DE 100 63 478 A1, a plurality of shape changing elements formed as air cushions are controlled in a timely offset manner by a control device via a pneumatic control member and lead to massaging of a person which uses the seat with a forward stroke by filling with pressure air and rearward stroke by air evacuation. The air filling and air evacuation of the air cushions is performed by electromagnetic valves. The air cushions are assembled in cushion groups, and in each pressure conduit leading from a pressure air source to a cushion group, a series connection of a 3/2 directional magnetic valve and a 2/2 magnetic valve is arranged. Conventionally, the valves are mounted being assembled into valve blocks. Such valve blocks are very heavy and have great volumes, and are difficult to integrate into the seat.

Another known arrangement is disclosed in the German patent document DE 31 42 833 A1 and has a displacement valve formed as a control slider of a rotary slider. It has a central pressure chamber which is filled from the medium going from a pressure modulator. This rotary slider is substantially cup-shaped and in its side wall has a radial outwardly extending open passage. In this region a seal is placed on the outer surface of the wall of the rotary slider and has a central throughgoing passage coinciding with the passage of the rotary slider. The rotary slider is rotationally displaceable inside of a substantially cup-shaped housing. The cup-shaped housing has a plurality of inner radial passages spaced from one another in a circumferential direction and merging into axial passages with connecting openings for conduits. The inner passages are located axially at a height of the radial passage of the rotary slider. The rotary slider can be turned into different rotary positions. Its passage correspondingly communicates through a throughgoing passage in the sealing ring with an inner passage of the housing, so that fluid located in the central passage chamber can be supplied through this passage connection into the corresponding conduit to the corresponding shape changing element. Also, arrangement that is united with a pressure modulator to form an assembly, has a great dimension and is heavy and requires a lot of space.

SUMMARY OF THE INVENTION

Accordingly, it is an object of the present invention to provide an arrangement for controlling a fluid volume of the above mentioned general type, which eliminates the disadvantages of the prior art.

More particularly, it is an object of the present invention to provide an arrangement for controlling a fluid volume of the above mentioned type, which with the same functionality, has a smaller structural volume and a smaller structural weight.

In keeping with these objects and with others which will become apparent hereinafter, one feature of the present invention resides, briefly stated, in a device for controlling a fluid volume in shape changing elements of vehicle seats, comprising a sliding valve connectable with a fluid pressure source and with shape changing elements for filling the shape changing elements with fluid and discharging fluid from the shape changing elements, said sliding valve having a housing provided with connecting openings for a corresponding one of the shape changing elements and a control slider movable in said housing relative to said connecting openings, said control slider having at least one control opening cooperating with said connecting openings and at least one connecting passage which opens in said control opening and is loadable with fluid from the fluid pressure source, said control slider being formed as an axial slider which is guided in said housing, said axial slider having an axial displaceably sliding head provided with said at least one control opening and said at least one connecting passage and a slider rod rigidly connected with said slider head for axial displacement of said slider head, and said connecting openings in a sliding direction of said slider head being arranged in a row at a distance one after the other.

When the arrangement is designed in accordance with the present invention for controlling the fluid volume in shape changing elements of seats, it has the advantage that due to the formation of the control member as a sliding valve with a control slider in form of an axial slider, which brings at least one control opening in a fluid connection with a corresponding connecting opening, in a simple manner any control of the individual shape changing element can be performed.

The sliding valve with the same operational range can be formed smaller and lighter, and also can be simply integrated into the seat. The sliding valve can be provided with several parallel control openings, with a predetermined number of connecting openings associated with a corresponding control opening. By providing an additional switching valve in accordance with the present invention, it is possible to fill or to empty a plurality of shape changing elements in the seat with fluid, simultaneously or after one another in time.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
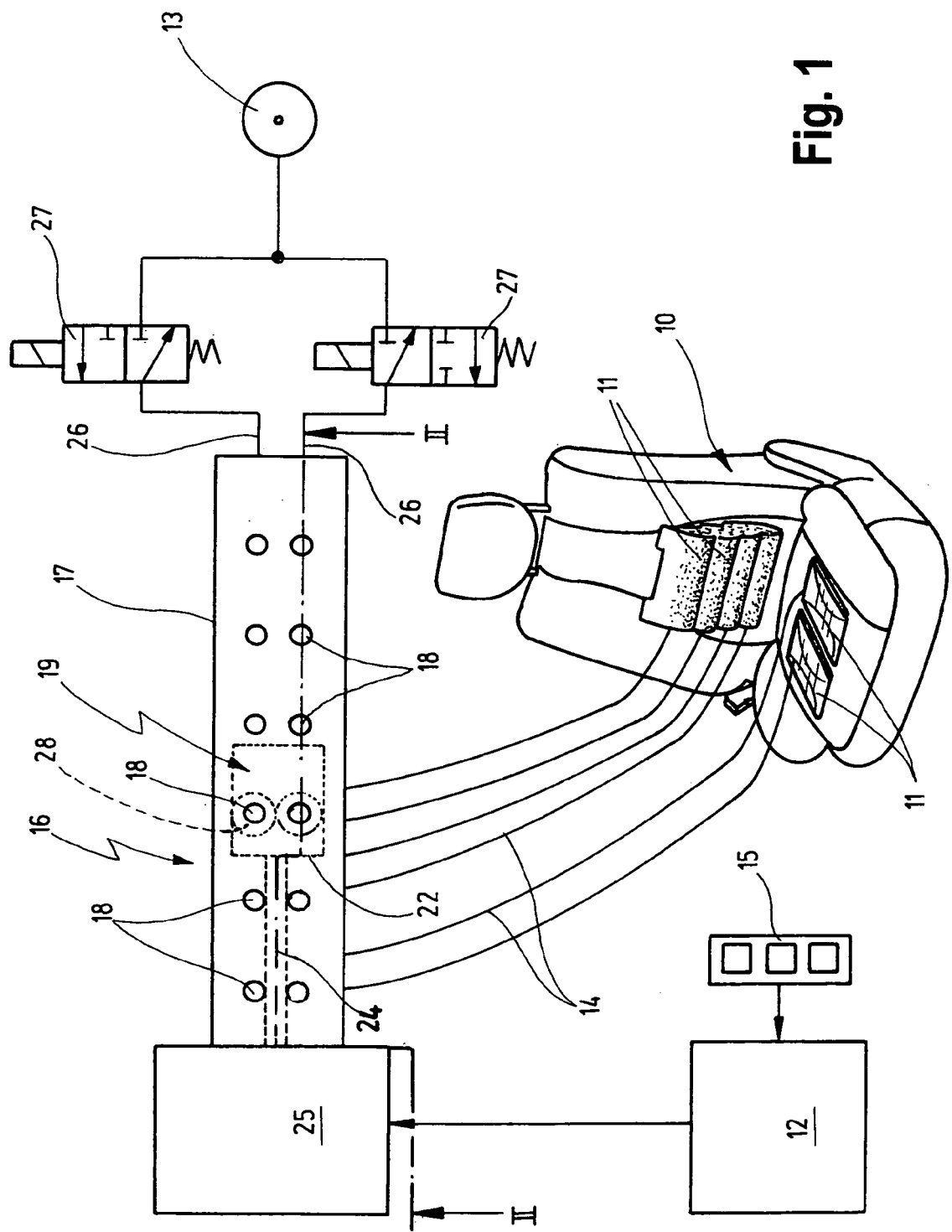
FIG. 1 is a perspective view of a vehicle seat with a control arrangement for a fluid volume in shape changing elements of vehicle seat, in accordance with the present invention.

A vehicle seat 10 shown in FIG. 1 is provided for example with four shape changing elements 11 formed as air cushions and arranged in its back, and is also provided with two shape changing elements 11 integrated in its seat surface and also formed as air cushions.

A control arrangement shown schematically in FIG. 1 can modify the fluid volumes in the shape changing elements 11, or in other words the air filling of the air cushions, to adapt on the one hand the seat contour to individual desires of the seat user, and to perform on the other hand a massaging of the seat user.

The fluid can be any flowable medium, which, in addition to air, can be also other gasses and liquids. However, conventionally it is preferable to use pressure air.

In the case of massage, the shape changing elements 11, here the air cushions, perform a forward stroke by filling (inflating) and a rearward stroke by emptying (air evacuation) in a predetermined, time sequence. The sequence program is stored in a microcomputer 12 and can be retrieved by the seat user via a keyboard 15. The microcomputer 12 controls a control member which is arranged between a fluid pressure source 13 and supply conduits 14 to the shape changing elements 11. In the case when the shape changing elements are formed as air cushions, the fluid pressure source 13 is an air pressure source, for example a compressor with a pressure air storage, and a control member is a pneumatic control member.

The control member is formed as a sliding valve 16. It includes a housing 17 with connecting openings 18 each for a supply conduit 14 to a shape changing element 11, and a control slider 19 displaceable in the housing 17. The control slider 19 has at least one control opening 20 which cooperates with the connecting opening 18 in the housing 17, and at least one connecting passage 21 which opens into the control opening 20 and loaded with fluid from the fluid pressure source 13. By displacing the control slider 19, the control opening 20 can be oriented in alignment with a selected connecting opening 18, so that a connection between the fluid pressure source 13 and the corresponding supply conduit 14 which leads to a shape changing element 11 is established. During the aligned orientation of the control opening 20 with a selected connecting opening 18, the remaining connecting openings 18 in the embodiment shown in FIG. 2 are open in the housing 17, and thereby the closed shape changing element 11 empty, while in the embodiment example shown in FIGS. 3 and 4 the remaining connecting openings 18 are fluid-tightly closed by the control slider 19, so that the fluid or air pressure is maintained in the shape changing elements 11.

Figure 2:
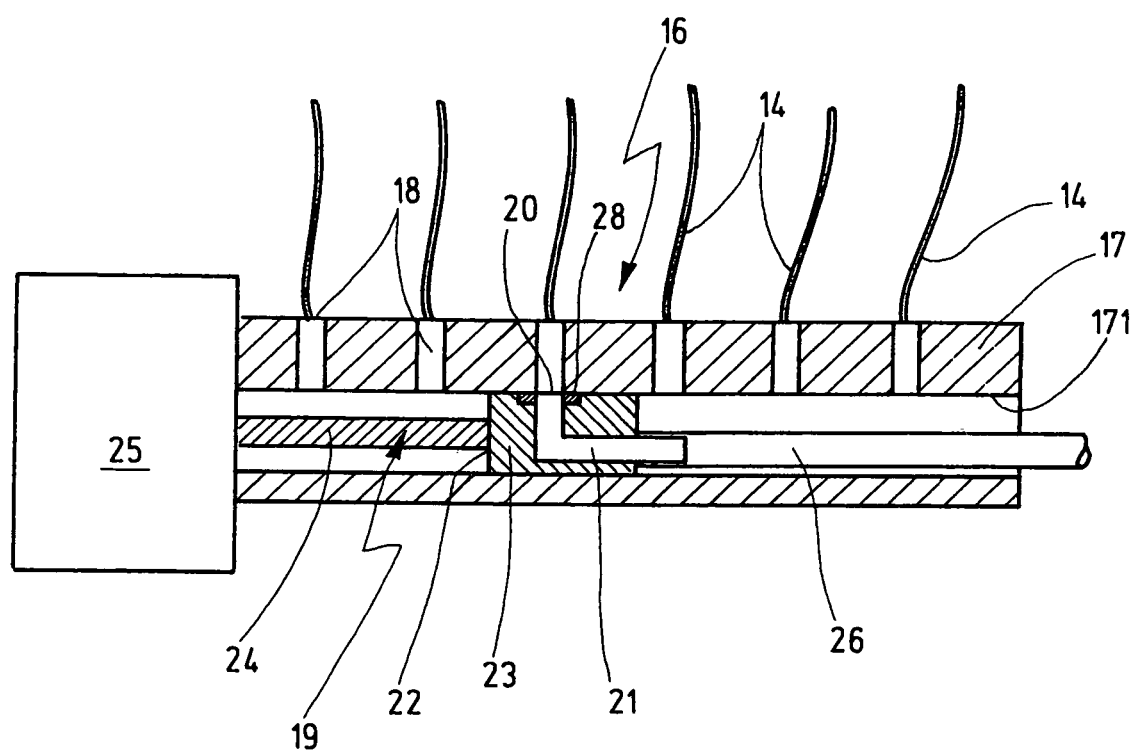
FIG. 2 is a view showing a section taken along the line II-II in FIG. 1 of a sliding valve of the control device in accordance with the present invention.

In the embodiment example shown in FIGS. 1 and 2, the control slider 19 is formed as an axial slider 22. It includes a slider head 23 which has a control opening 20 and a connecting passage 21, and a slider rod 24 which is rigidly connected with the slider head 23. The slider rod 24 is coupled with a motor drive 25, for example a linear stepper motor. The slider head 23 which is axially displaceable in the longitudinally extending, rectangular housing 17, is sealed in the region of the control opening 20 by a surrounding ring seal 28, with respect to the housing wall 171 which contains the connecting openings 18. The connecting openings 18 are arranged in a row one after the other in the sliding direction of the slider head 23, at a distance from one another.

In the embodiment example of FIGS. 1 and 3, the connecting openings 18 are subdivided into two groups with the same number of the connecting openings 18. In each group the connecting openings 18 are arranged one behind the other in the sliding direction of the slider head 23, while the both groups form two rows oriented parallel to one another. The slider head 23 has two separated control openings 20 with the connecting passage 21, with a row of the connecting openings 18 associated with each control opening 20.

Each connecting passage 21 is connected with the fluid pressure source 13 through a separate connecting conduit 26. A ³⁄₂ directional magnetic valve 27 is arranged in each connecting conduit 26. Via the ³⁄₂ directional magnetic valve 27 the associated connecting passage 21 can be connected with the fluid pressure source 13 or can be connected with an unloading conduit for air evacuation.

The arrangement of the both control openings 20 in the slider head 23 and their association with two rows of the connecting openings 18 is selected so that one connecting opening 18 from each row coincides simultaneously with the associated control opening 20, while the remaining connecting openings 18 are open and thereby the shape changing elements 11 connected to them can be emptied. In the position of the both ³⁄₂ directional magnetic valves 27 shown in FIG. 1, the both connecting passages 21 are unloaded. When the both ³⁄₂ directional magnetic valves 27 are switched over, the both control openings 20 are simultaneously connected to the fluid pressure source 13. With selected switching over of one or the other ³⁄₂ directional magnetic valve 27, the both control openings 20 can be connected to the fluid pressure source 13 one after the other in time.

When the motor drive 25 for the axial slider 22 is controlled in accordance with the predetermined program by the microcomputer 12, the slider head 23 is moved into different adjusting positions with the control openings 20. In each position at least one shape changing element is air filled, while a previously filled shape changing element 11 by changing of the slider head position is again emptied (evacuated). When the shape changing elements 11 are controlled in a predetermined sequence, so that they perform a forward stroke and subsequently a reverse stroke, a massaging action for the seat user is provided.

It will be understood that each of the elements described above, or two or more together, may also find a useful application in other types of constructions differing from the types described above.

While the invention has been illustrated and described as embodied in arrangement for controlling a fluid volume in shape changing elements of seats, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A device for controlling a fluid volume in shape changing elements of vehicle seats, comprising a sliding valve connectable with a fluid pressure source and with shape changing elements for filling the shape changing elements with fluid and discharging fluid from the shape changing elements, said sliding valve having a housing provided with connecting openings for a corresponding one of the shape changing elements and a control slider movable in said housing relative to said connecting openings, said control slider having at least one control opening cooperating with said connecting openings and at least one connecting passage which opens in said control opening and is loadable with fluid from the fluid pressure source, said control slider being formed as an axial slider which is guided in said housing, said axial slider having an axial displaceable slider head provided with said at least one control opening and said at least one connecting passage and a slider rod rigidly connected with said slider head for axial displacement of said slider head, and said connecting openings in a sliding direction of said slider head being arranged in a row at a distance one after the other.

2. A device as defined in claim 1, wherein said connecting openings are subdivided into at least two groups of said connecting openings arranged one after the other in a displacement direction of said control slider, said control slider having a plurality of separate said control openings with associated said connecting passage in correspondence with a number of the groups, wherein one of said groups of said connecting openings is associated with a corresponding one of said control openings.

3. A device as defined in claim 1, wherein said slider head at least in a region around said control opening is sealed from a housing wall which contains said connecting openings.

4. A device as defined in claim 1; and further comprising a drive, said slider rod being coupled with said drive.

5. A device as defined in claim 4, wherein said drive is formed as a motor drive.

6. A device as defined in claim 4, wherein said drive is formed as a stepper motor.

7. A device as defined in claim 1, wherein said housing is formed as a longitudinally extending housing.

8. A device as defined in claim 7, wherein said housing is rectangular.

9. A device as defined in claim 1; and further comprising a switching valve through which said connecting passage is connectable with the fluid pressure source.

* * * * *